(12) United States Patent
Takebe et al.

(10) Patent No.: US 9,587,334 B2
(45) Date of Patent: Mar. 7, 2017

(54) NON-WOVEN POLYPROPYLENE FABRIC

(75) Inventors: Tomoaki Takebe, Chiba (JP); Yutaka Minami, Chiba (JP); Yohei Koori, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 780 days.

(21) Appl. No.: 13/574,085

(22) PCT Filed: Jan. 20, 2011

(86) PCT No.: PCT/JP2011/051006
§ 371 (c)(1),
(2), (4) Date: Aug. 2, 2012

(87) PCT Pub. No.: WO2011/090132
PCT Pub. Date: Jul. 28, 2011

(65) Prior Publication Data
US 2012/0302982 A1  Nov. 29, 2012

(30) Foreign Application Priority Data

Jan. 21, 2010 (JP) ................................. 2010-011401
Apr. 23, 2010 (JP) ................................. 2010-100287

(51) Int. Cl.
| | | |
|---|---|---|
| *D04H 3/16* | (2006.01) | |
| *C08L 23/12* | (2006.01) | |
| *D01F 6/46* | (2006.01) | |
| *C08L 23/10* | (2006.01) | |
| *D04H 3/007* | (2012.01) | |
| *C08F 110/06* | (2006.01) | |

(52) U.S. Cl.
CPC ................ *D04H 3/16* (2013.01); *C08L 23/10* (2013.01); *C08L 23/12* (2013.01); *D01F 6/46* (2013.01); *D04H 3/007* (2013.01); *C08F 110/06* (2013.01); *Y10T 428/2915* (2015.01); *Y10T 442/60* (2015.04); *Y10T 442/609* (2015.04); *Y10T 442/68* (2015.04)

(58) Field of Classification Search
CPC ........... C08L 2205/025; C08L 2207/10; C08L 23/12; C08L 2203/12; C08L 2207/12; C08L 2207/14; C08F 110/06; C08F 2500/12; C08F 2500/15; C08F 2500/16; D01F 6/46; D01F 6/44; D01F 6/06; D04H 3/007; D04H 3/16; D01D 5/0985
USPC .................................................. 442/400, 401
See application file for complete search history.

(56) References Cited

U.S. PATENT DOCUMENTS

| | | | |
|---|---|---|---|
| 4,874,666 A | 10/1989 | Kubo et al. | |
| 6,734,270 B1 * | 5/2004 | Minami et al. | 526/351 |
| 7,199,202 B2 * | 4/2007 | Minami et al. | 526/351 |
| 8,071,687 B2 * | 12/2011 | Jiang et al. | 525/240 |
| 8,088,867 B2 * | 1/2012 | Jiang et al. | 525/240 |
| 2003/0181112 A1 | 9/2003 | Ishikawa et al. | |
| 2009/0098786 A1 * | 4/2009 | Tajima et al. | 442/327 |
| 2010/0029164 A1 * | 2/2010 | Datta et al. | 442/414 |
| 2010/0190405 A1 | 7/2010 | Takebe et al. | |
| 2012/0208422 A1 | 8/2012 | Koori et al. | |

FOREIGN PATENT DOCUMENTS

| | | |
|---|---|---|
| JP | 6 322609 | 11/1994 |
| JP | 2002 38364 | 2/2002 |
| JP | 2002 201560 | 7/2002 |
| JP | 2003 27331 | 1/2003 |
| WO | 2006 051708 | 5/2006 |
| WO | 2007 138733 | 12/2007 |
| WO | 2009 001871 | 12/2008 |

OTHER PUBLICATIONS

U.S. Appl. No. 13/581,904, filed Aug. 30, 2012, Takebe, et al.
International Search Report Issued Apr. 19, 2011 in PCT/JP11/51006 Filed Jan. 20, 2011.

* cited by examiner

*Primary Examiner* — Jennifer A Steele
(74) *Attorney, Agent, or Firm* — Oblon, McClelland, Maier & Neustadt, L.L.P.

(57) ABSTRACT

Provided is a non-woven fabric produced by using a polypropylene-based resin composition containing a specific low-crystalline polypropylene. The non-woven fabric is a non-woven fabric obtained by achieving reductions in denier values of fibers, the non-woven fabric being excellent in dispersibility of the fibers.

15 Claims, No Drawings

NON-WOVEN POLYPROPYLENE FABRIC

TECHNICAL FIELD

The present invention relates to a polypropylene-based non-woven fabric, and more specifically, to a non-woven fabric formed of fibers each having an extremely small diameter, the non-woven fabric being excellent in dispersibility of the fibers.

BACKGROUND ART

In recent years, a polypropylene-based fiber and non-woven fabric have been finding use in various applications such as a disposable diaper, a sanitary product, a hygienic product, a clothing material, a bandage, and a packaging material. A reduction in basis weight of the non-woven fabric is important because weight reductions are typically required for those products. In addition, a non-woven fabric excellent in dispersibility of its fibers and having a small mesh size is needed particularly for the disposable diaper, the sanitary product, or the like because the prevention of the oozing of a hot-melt adhesive or the prevention of the leakage of urine is required for such product.

A method of improving the dispersibility of fibers constituting a non-woven fabric is, for example, to reduce the denier values of the fibers. A method of achieving the reductions in denier values of the fibers is, for example, the production of the non-woven fabric by a meltblown method, and in this case, the denier values can be reduced by, for example, a reduction in discharge amount, an increase in flow rate of compressed air (see Patent Literature 1). However, when the production condition is adopted, the fibers cannot withstand a spinning tension and hence are apt to cause end breakage. In addition, a liquid droplet has fallen onto a web to cause a defective molding called a shot in some cases.

CITATION LIST

Patent Literature

[PTL 1] JP 2002-201560 A

SUMMARY OF INVENTION

Technical Problem

The present invention has been made in view of the circumstances, and an object of the present invention is to provide a non-woven fabric obtained by achieving reductions in denier values of fibers, the non-woven fabric being excellent in dispersibility of the fibers.

Solution to Problem

The inventors of the present invention have made extensive studies, and as a result, have found that the problem is solved by using a resin composition containing a specific polypropylene. The present invention has been completed on the basis of such finding.

That is, the present invention provides the following:

1. A non-woven fabric, which is obtained by using a polypropylene-based resin composition, in which:
   the polypropylene-based resin composition
   contains a low-crystalline polypropylene and a high-crystalline polypropylene,
   contains the low-crystalline polypropylene at a content of 5 to 50 mass % with reference to a total of the low-crystalline polypropylene and the high-crystalline polypropylene, and
   has a melt flow rate of 500 to 2,000 g/10 min and a melting endotherm $\Delta H$ measured by DSC of 50 to 95 J/g; and
   the low-crystalline polypropylene includes a polypropylene satisfying the following characteristics (a) to (f):
   (a) [mmmm]=20 to 60 mol %;
   (b) [rrrr/(1-mmmm)]≤0.1;
   (c) [rmrm]>2.5 mol %;
   (d) $[mm]\times[rr]/[mr]^2 \leq 2.0$;
   (e) weight-average molecular weight (Mw)=10,000 to 200,000; and
   (f) molecular weight distribution (Mw/Mn)<4;
2. The non-woven fabric according to the above-mentioned item 1, in which the non-woven fabric is produced by a meltblown method;
3. A non-woven fabric laminate, including the non-woven fabric according to the above-mentioned item 1 or 2; and
4. A fiber product, which is obtained from the non-woven fabric according to the above-mentioned item 1 or 2, or the non-woven fabric laminate according to the above-mentioned item 3.

Advantageous Effects of Invention

According to the present invention, provided is a non-woven fabric obtained by achieving reductions in denier values of fibers, the non-woven fabric being excellent in dispersibility of the fibers. The non-woven fabric has an extremely small mesh size, is excellent in water pressure resistance, and is preferably used particularly in a hygienic material such as a paper diaper. In addition, even when a meltblown method is utilized for reductions in denier values of fibers, a non-woven fabric can be produced without the induction of any shot, and hence a high-quality non-woven fabric is provided.

DESCRIPTION OF EMBODIMENTS

A non-woven fabric of the present invention is produced by using a polypropylene-based resin composition containing a low-crystalline polypropylene and a high-crystalline polypropylene. It should be noted that, in the present invention, the term "low-crystalline polypropylene" refers to a crystalline polypropylene whose stereoregularity is moderately disturbed, and specifically, to a polypropylene satisfying the following characteristic (a). On the other hand, the term "high-crystalline polypropylene" refers to a crystalline polypropylene having a melting point of 155° C. or more.

(Low-Crystalline Polypropylene)

The low-crystalline polypropylene to be used in the present invention is a polypropylene satisfying the following characteristics (a) to (f).

(a) [mmmm]=20 to 60 mol %

The low-crystalline polypropylene to be used in the present invention has a meso pentad fraction [mmmm] of 20 to 60 mol %. When the [mmmm] is smaller than 20 mol %, solidification after melting is so slow that the fiber adheres to a winding roll to make continuous molding difficult. In addition, when the [mmmm] becomes larger than 60 mol %, a degree of crystallinity is so high that end breakage is apt to occur. From such viewpoints, the [mmmm] is preferably 30 to 50 mol %, more preferably 40 to 50 mol %.

(b) [rrrr]/(1-[mmmm])≤0.1

The low-crystalline polypropylene to be used in the present invention has a [rrrr]/(1-[mmmm]) of 0.1 or less. The [rrrr]/(1-[mmmm]) is an indicator for the uniformity of the regularity distribution of the low-crystalline polypropylene. When the value becomes large, a mixture of a high-stereo-regularity polypropylene and an atactic polypropylene is obtained as in the case of a conventional polypropylene produced by using an existing catalyst system, and the mixture causes tack. From such viewpoint, the [rrrr]/(1-[mmmm]) is preferably 0.05 or less, more preferably 0.04 or less.

(c) [rmrm]>2.5 mol %

The low-crystalline polypropylene to be used in the present invention has a [rmrm] in excess of 2.5 mol %. When the [rmrm] is 2.5 mol % or less, the randomness of the low-crystalline polypropylene reduces, the degree of crystallinity increases owing to crystallization by an isotactic polypropylene block chain, and end breakage is apt to occur. From such viewpoint, the [rmrm] is preferably 2.6 mol % or more, more preferably 2.7 mol % or more. An upper limit for the [rmrm] is typically about 10 mol %.

(d) [mm]×[rr]/[mr]$^2$≤2.0

The low-crystalline polypropylene to be used in the present invention has a [mm]×[rr]/[mr]$^2$ of 2.0 or less. The [mm]×[rr]/[mr]$^2$ is an indicator for the randomness of the polymer, and the polymer has higher randomness, and end breakage and tack are greatly suppressed as the value reduces. From such viewpoint, the [mm]×[rr]/[mr]$^2$ is preferably 0.25 to 1.8, more preferably 0.5 to 1.5.

(e) Weight-average molecular weight (Mw)=10,000 to 200,000

The low-crystalline polypropylene to be used in the present invention has a weight-average molecular weight of 10,000 to 200,000. When the weight-average molecular weight is 10,000 or more, the viscosity of the low-crystalline polypropylene is not excessively low but moderate, and hence end breakage upon spinning is suppressed. In addition, when the weight-average molecular weight is 200,000 or less, the viscosity of the low-crystalline polypropylene is not excessively high and spinnability is improved. From such viewpoints, the weight-average molecular weight is preferably 30,000 to 100,000, more preferably 40,000 to 80,000.

(f) Molecular weight distribution (Mw/Mn)<4

The low-crystalline polypropylene to be used in the present invention has a molecular weight distribution (Mw/Mn) of less than 4. When the molecular weight distribution is less than 4, the occurrence of tack in a fiber obtained by spinning is suppressed. The molecular weight distribution is preferably 3 or less.

The use of the low-crystalline polypropylene satisfying the characteristics (a) to (f) together with the high-crystalline polypropylene compensates for the drawbacks of the high-crystalline polypropylene, thereby providing a raw material composition suitable for the production of the target nonwoven fabric.

It should be noted that, as long as the above-mentioned characteristics (a) to (f) are satisfied, the low-crystalline polypropylene to be used in the present invention may be a copolymer using a comonomer except propylene to such an extent that the object of the present invention is not impaired. In this case, the content of the comonomer is typically 2 mass % or less. Examples of the comonomer include ethylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. In the present invention, one kind or two or more kinds thereof can be used.

A method of producing the low-crystalline polypropylene to be used in the present invention is, for example, a method involving using a metallocene catalyst. The metallocene catalyst is, for example, a metallocene catalyst obtained by combining a transition metal compound (A) in which crosslinked structures are formed through two crosslinking groups and a co-catalyst (B). A specific example of the metallocene catalyst is a catalyst for polymerization containing the transition metal compound (A) represented by the general formula (I) and the co-catalyst component (B) selected from a compound (B-1) and an aluminoxane (B-2) each capable of reacting with the transition metal compound as the component (A) or a derivative of the compound to form an ionic complex.

[Chem. 1]

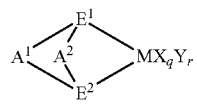

(I)

(In the formula:

M represents a metal element belonging to any one of Groups 3 to 10 or a lanthanoid series in the periodic table;

E$^1$ and E$^2$ each represent a ligand selected from a substituted cyclopentadienyl group, an indenyl group, a substituted indenyl group, a heterocyclopentadienyl group, and a substituted heterocyclopentadienyl group, form crosslinked structures through A$^1$ and A$^2$, and may be identical to or different from each other;

X represents a σ-bonding ligand, and when a plurality of X's are present, the plurality of X's may be identical to or different from each other, and each X may crosslink with any other X, E$^1$, E$^2$, or Y;

Y represents a Lewis base, and when a plurality of Y's are present, the plurality of Y's may be identical to or different from each other, and each Y may crosslink with any other Y, E$^1$, E$^2$, or X;

A$^1$ and A$^2$ each represent a divalent crosslinking group that bonds two ligands, each represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$— where R$^1$ represents a hydrogen atom, a halogen atom, a hydrocarbon group having 1 to 20 carbon atoms, or a halogen-containing hydrocarbon group having 1 to 20 carbon atoms, and may be identical to or different from each other;

q represents an integer of 1 to 5 corresponding to ((valence of M)-2); and r represents an integer of 0 to 3.)

Specific examples of the transition metal compound represented by the general formula (I) include (1,2'-dimethylsilylene) (2,1'-dimethylsilylene)bis(3-n-butylindenyl)zirconium dichloride, (1,2'-dimethylsilylene) (2,1'-dimethylsilylene)bis(3-trimethylsilylmethylindenyl) zirconium dichloride, (1,2'-dimethylsilylene) (2,1'-dimethylsilylene)bis(3-phenylindenyl)zirconium dichloride, (1,2'-dimethylsilylene) (2,1'-dimethylsilylene)bis(4,5-benzoindenyl)zirconium dichloride, (1,2'-dimethylsilylene) (2,1'-dimethylsilylene)bis(4-isopropylindenyl)zirconium dichloride, (1,2'-dimethylsilylene) (2,1'-dimethylsilylene) bis(5,6-dimethylindenyl)zirconium dichloride, (1,2'-dimethylsilylene) (2,1'-dimethylsilylene)bis(4,7-di-isopropylindenyl)zirconium dichloride, (1,2'-dimethylsilylene) (2,1'-dimethylsilylene)bis(4-phenylindenyl)zirconium dichloride, (1,2'-dimethylsilylene) (2,1'-dimethylsilylene)bis(3-methyl-4-isopropylindenyl)zirconium dichloride, (1,2'-dimethylsilylene) (2,1'-dimethylsilylene)bis(5,6-benzoindenyl)zirconium dichloride, (1,2'-dimethylsilylene) (2,1'-isopropylidene)-bis(indenyl)zirconium dichloride, (1,2'-dimethylsilylene) (2,1'-isopropylidene)-bis(3-methylindenyl)zirconium dichloride, (1,2'-dimethylsilylene) (2,1'-isopropylidene)-bis(3-isopropylindenyl)zirconium dichloride, (1,2'-dimethylsilylene) (2,1'-isopropylidene)-bis(3-n-butylindenyl)zirconium dichloride, and (1,2'-dimethylsilylene) (2,1'-isopropylidene)-bis(3-trimethylsilylmethylindenyl)zirconium dichloride, and compounds obtained by substituting zirconium with titanium or hafnium in those compounds.

Other examples of the transition metal compound in the metallocene catalyst include dichloro[dimethylsilylene(cyclopentadienyl) (2,4-dimethyl-4H-1-azulenyl)]hafnium, dichloro[dimethylsilylene(cyclopentadienyl) (2,4-dimethyl-4H-5, 6,7,8-tetrahydro-1-azulenyl)]hafnium, dichloro[dimethylsilylene(cyclopentadienyl) (2-ethyl-4-methyl-4H-1-azulenyl)]hafnium, dichloro[dimethylsilylene (cyclopentadienyl) (2-ethyl-4-methyl-4H-5,6,7,8-tetrahydro-1-azulenyl)]hafnium, dichloro[dimethylsilylene (9-fluorenyl) (2,4-dimethyl-4H-1-azulenyl)]hafnium, dichloro[dimethylsilylene(cyclopentadienyl) (2-n-propyl-4-methyl-4H-1-azulenyl)]hafnium, dichloro[dimethylsilylene (cyclopentadienyl) (2-isopropyl-4-methyl-4H-1-azulenyl] hafnium, dichloro[dimethylgermirene(cyclopentadienyl) (2,4-dimethyl-4H-1-azulenyl)]hafnium, and metallocene compounds obtained by substituting a metal atom with zirconium in those compounds. Further, there are exemplified dimethylsilylene(2-methyl-4-phenyl-indenyl) (2-(2-furyl)-4-phenyl-indenyl)zirconium dichloride, dimethylsilylene(2-methyl-4-phenyl-4-hydroazulenyl) (2-(2-(5-methyl)-furyl)-4-phenyl-4-hydroazulenyl)zirconium dichloride, dimethylsilylene(2-methyl-4-phenyl-4-hydroazulenyl) (2-methyl-4-(2-(5-methyl)-thienyl)-4-hydroazulenyl)zirconium dichloride, dimethylsilylene(2-methyl-benzoindenyl) (2-(2-(5-methyl)-furyl)-benzoindenyl)zirconium dichloride, dimethylsilylene(2-methyl-4-(2-thienyl)-indenyl) (2-isopropyl-4-(2-thienyl)-indenyl)zirconium dichloride, dimethylsilylene(2-methyl-4-(2-(5-methyl)-thienyl)-indenyl) (2-isopropyl-4-(2-(5-methyl)-thienyl)-indenyl) zirconium dichloride, dimethylsilylene(2-methyl-4-(2-(5-t-butyl)-thienyl)-indenyl) (2-isopropyl-4-(2-(5-t-butyl)-thienyl)-indenyl)zirconium dichloride, and metallocene compounds obtained by substituting an indenyl skeleton with a tetrahydroindenyl skeleton in those compounds.

Next, examples of the component (B-1) of the component (B) include dimethylanilinium tetrakispentaflourophenylborate, triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, and benzyl(tri-n-butyl) ammonium tetraphenylborate.

One kind of the components (B-1) may be used, or two or more kinds thereof may be used in combination. Meanwhile, examples of the aluminoxane as the component (B-2) include methylaluminoxane, ethylaluminoxane, and isobutylaluminoxane. One kind of those aluminoxanes maybe used, or two or more kinds thereof may be used in combination. In addition, one or more kinds of the components (B-1) and one or more kinds of the components (B-2) may be used in combination.

The catalyst for polymerization can use an organic aluminum compound as a component (C) in addition to the components (A) and (B). Here, examples of the organic aluminum compounds as the component (C) include triethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride. One kind of those organic aluminum compounds may be used, or two or more kinds thereof may be used in combination. Here, upon polymerization of propylene, at least one kind of the catalyst components can be used while being carried by a proper carrier.

A method for the polymerization is not particularly limited, and any one of the methods such as a slurry polymerization method, a vapor phase polymerization method, a bulk polymerization method, a solution polymerization method, and a suspension polymerization method may be employed. Of those, a bulk polymerization method and a solution polymerization method are particularly preferred. A polymerization temperature is typically −100 to 250° C., and with regard to a usage ratio of the catalyst to the reaction raw material, a molar ratio of the raw material monomer to the component (A) is preferably 1 to $10^8$, particularly preferably 100 to $10^5$. Further, a polymerization time is typically 5 minutes to 10 hours, and a reaction pressure is typically normal pressure to 20 MPa (gauge).

(High-Crystalline Polypropylene)

The kind of the high-crystalline polypropylene to be used in the present invention is not particularly limited as long as the polypropylene can satisfy physical properties concerning a polypropylene-based resin composition to be described later, and examples thereof include a propylene homopolymer, a propylene random copolymer, and a propylene block copolymer. The high-crystalline polypropylene has a melt flow rate (MFR) of typically 100 to 2,000 g/10 min, preferably 500 to 1,600 g/10 min, more preferably 700 to 1,500 g/10 min, and has a melting point of typically 150 to 167° C., preferably 155 to 165° C.

(Polypropylene-Based Resin Composition)

The polypropylene-based resin composition to be used in the present invention contains the low-crystalline polypropylene and the high-crystalline polypropylene, and contains the low-crystalline polypropylene at a content of 5 to 50 mass % with reference to the total of the low-crystalline polypropylene and the high-crystalline polypropylene. When the content is less than 5 mass %, the drawbacks of the high-crystalline polypropylene cannot be compensated for, which makes it difficult to achieve reductions in denier values of the fibers without increasing the number of shots. From the viewpoint, the content is preferably 10 to 50 mass %, more preferably 20 to 50 mass %.

The polypropylene-based resin composition to be used in the present invention is a resin composition having a melt flow rate of 500 to 2,000 g/10 min and a melting endotherm (ΔH) of 50 to 95 J/g.

When the melt flow rate of the polypropylene-based resin composition is less than 500 g/10 min, its spinnability reduces. On the other hand, when the melt flow rate exceeds 2,000 g/10 min, the composition is apt to cause end breakage in a non-woven fabric-molding process. From such viewpoints, the melt flow rate of the polypropylene-based resin composition is preferably 600 to 1,600 g/10 min, more preferably 800 to 1,500 g/10 min.

When the melting endotherm of the polypropylene-based resin composition is less than 50 J/g, the non-woven fabric is apt to be tacky because the crystallization of the resin composition is slow. On the other hand, when the melting endotherm exceeds 95 J/g, the crystallization is fast. Accordingly, the non-woven fabric becomes brittle and hence a shot due to end breakage is apt to occur. From such viewpoints, the melting endotherm of the polypropylene-based resin composition is preferably 65 to 93 J/g, more preferably 75 to 90 J/g.

The polypropylene-based resin composition to be used in the present invention may contain any other thermoplastic resin or additive as long as the composition satisfies the physical properties.

Examples of the any other thermoplastic resin include olefin-based polymers, specifically a polypropylene, a propylene-ethylene copolymer, a propylene-ethylene-diene copolymer, a polyethylene, an ethylene/a-olefin copolymer, an ethylene-vinyl acetate copolymer, and a hydrogenated styrene-based elastomer. One kind of those thermoplastic resins may be used alone, or two or more kinds thereof may be used in combination.

As the additive, any conventionally known additives may be blended. Examples of the additives include a foaming agent, a crystal nucleating agent, a weatherability stabilizer, a UV absorber, a light stabilizer, a heat resistance stabilizer, an antistatic agent, a mold releasing agent, a flame retardant, a synthetic oil, a wax, an electric property-improving agent, a slip inhibitor, an anti-blocking agent, a viscosity-controlling agent, a coloring inhibitor, a defogging agent, a lubricant, a pigment, a dye, a plasticizer, a softening agent, an age resistor, a hydrochloric acid-absorbing agent, a chlorine scavenger, an antioxidant, and an antitack agent.

(Non-Woven Fabric)

The non-woven fabric of the present invention uses the polypropylene-based resin composition as a raw material. The use of the resin composition enables the production of a non-woven fabric without the induction of any shot even when a meltblown method is utilized for reductions in denier values of fibers, and hence a high-quality non-woven fabric is obtained.

The meltblown method typically involves: extruding a molten resin from a nozzle; bringing the extruded resin into contact with a high-speed heated gas flow to provide fine fibers; and collecting the fine fibers on a movable collecting surface to provide the non-woven fabric.

Conditions for the production of the non-woven fabric of the present invention are, for example, a melting temperature of the resin of 220 to 270° C., a single-hole discharge amount of 0.1 to 0.5 g/min, and a temperature and flow rate of the heated gas flow of 250 to 280° C. and 200 to 600 m$^3$/hr, and are preferably a melting temperature of the resin of 220 to 260° C., a single-hole discharge amount of 0.1 to 0.3 g/min, and a temperature and flow rate of the heated gas flow of 250 to 270° C. and 250 to 550 m$^3$/hr.

A non-woven fabric produced by the meltblown method has good texture because the average diameter of its fibers is generally small. Particularly in the present invention, the use of the polypropylene-based resin composition can reduce the diameters of fibers without causing any shot, thereby enabling stable production of a non-woven fabric constituted of the fibers having an average diameter of, for example, about 1.0 μm. In addition, the use enables the production of a non-woven fabric excellent in dispersibility of its fibers and having a small mesh size.

(Non-Woven Fabric Laminate)

The non-woven fabric of the present invention can be used as one layer of a non-woven fabric laminate, and the laminate is, for example, a non-woven fabric laminate obtained by laminating a meltblown non-woven fabric (M) of the present invention and a spunbonded non-woven fabric (S) obtained by a spunbond method. The non-woven fabric laminate including such SM structure formed of the spunbonded non-woven fabric layer and the meltblown non-woven fabric layer shows excellent flexibility. In addition, the non-woven fabric laminate maybe a laminate obtained by the repetition of the SM structure. Further, the non-woven fabric laminate may be a laminate having a structure in which the layers of the spunbonded non-woven fabrics (S) exist on both sides of the layer of the meltblown non-woven fabric (M) (that is, a non-woven fabric laminate of an SMS structure formed of the spunbonded non-woven fabric layer, the meltblown non-woven fabric layer, and the spunbonded non-woven fabric layer), and the SMS structure may be repeated. The non-woven fabric laminate of the SMS structure is preferred in terms of a balance between the strength and flexibility of the laminate. The basis weight of the non-woven fabric laminate of the SMS structure is typically 7 to 100 g/m$^2$, preferably 10 to 70 g/m$^2$, more preferably 10 to 50 g/m$^2$.

It should be noted that a material for the spunbonded non-woven fabric layer is not particularly limited, and examples of the material include a polyethylene, a polypropylene, and a polyester.

The production of the non-woven fabric laminate may be performed in accordance with any method without any particular limitation as long as the method involves laminating a spunbonded non-woven fabric and a meltblown non-woven fabric, and integrating both the layers so that the laminate can be formed. For example, a method involving directly depositing fibers formed by the meltblown method on a spunbonded non-woven fabric to form a meltblown non-woven fabric, and fusing the spunbonded non-woven fabric and the meltblown non-woven fabric, a method involving superimposing a spunbonded non-woven fabric and a meltblown non-woven fabric, and fusing both the non-woven fabrics by heating and pressurization, or a method involving bonding a spunbonded non-woven fabric and a meltblown non-woven fabric with an adhesive such as a hot-melt adhesive or a solvent-based adhesive can be adopted.

The method involving directly forming a meltblown non-woven fabric on a spunbonded non-woven fabric can be performed by a meltblown method involving spraying a molten product of the polypropylene-based resin composition on the surface of the spunbonded non-woven fabric to deposit fibers. At this time, the fibers formed by the meltblown method are sprayed and deposited with a pressure on the surface opposite to the surface on the side where the molten product is sprayed onto the spunbonded non-woven fabric set to a negative pressure. At the same time, the spunbonded non-woven fabric and the meltblown non-woven fabric are integrated so that a flexible non-woven fabric laminate having the spunbonded non-woven fabric layer and the meltblown non-woven fabric layer may be obtained. When the integration of both the non-woven fabrics is insufficient, the non-woven fabrics can be sufficiently integrated with, for example, a heating and pressurizing emboss roll.

Examples of the method involving fusing a spunbonded non-woven fabric and a meltblown non-woven fabric by heat fusion include: a method involving subjecting the entire contact surface of the spunbonded non-woven fabric and the meltblown non-woven fabric to heat fusion; and a method involving subjecting part of the contact surface of the spunbonded non-woven fabric and the meltblown non-woven fabric to heat fusion. In the present invention, the spunbonded non-woven fabric and the meltblown non-woven fabric are preferably fused by a heat embossing method. In this case, a fusing area accounts for 5 to 35%, preferably 10 to 30% of the contact area of the spunbonded non-woven fabric and the meltblown non-woven fabric. When the ratio of the fusing area falls within the range, the non-woven fabric laminate to be obtained is excellent in balance between its release strength and flexibility.

The following fiber products can be given as examples of a fiber product using the non-woven fabric or non-woven fabric laminate of the present invention. That is, a member for a disposable diaper, a stretchable member for a diaper cover, a stretchable member for a sanitary product, a stretchable member for a hygienic product, a stretchable tape, an adhesive bandage, a stretchable member for clothing, an insulating material for clothing, a heat insulating material for clothing, a protective suit, a hat, a mask, a glove, a supporter, a stretchable bandage, a base fabric for a fomentation, a non-slip base fabric, a vibration absorber, a finger cot, an air filter for a clean room, an electret filter subjected to electret processing, a separator, an adiabatic material, a coffee bag, a food packaging material, various members for automobiles such as a ceiling skin material for an automobile, an acoustic insulating material, a cushioning material, a speaker dust-proof material, an air cleaner material, an insulator skin, a backing material, an adhesive non-woven fabric sheet, and a door trim, various cleaning materials such as a cleaning material for a copying machine, the facing and backing of a carpet, an agricultural beaming, a timber drain, members for shoes such as a sport shoe skin, a member for a bag, an industrial sealing material, a wiping material, a sheet, and the like can be given. The non-woven fabric of the present invention is preferably used particularly in a hygienic material such as a paper diaper.

EXAMPLES

Production Example 1

(Production of Low-Crystalline Polypropylene A)

First, 20 L/h of n-heptane, 15 mmol/h of triisobutylaluminum, and further, 6 µmol/h in terms of zirconium of a catalyst component obtained by bringing dimethylanilinium tetrakispentafluorophenylborate, (1,2'-dimethylsilylene) (2,1'-dimethylsilylene)-bis(3-trimethylsilylmethylindenyl) zirconium dichloride, triisobutylaluminum, and propylene into contact with one another in advance were continuously supplied to a stainless reactor with a stirring machine having an internal volume of 0.2 m³.

Then, propylene and hydrogen were continuously supplied so that a hydrogen concentration in the vapor phase portion and the total pressure in the reactor were kept at 8 mol % and 0.7 MPa·G, respectively at a polymerization temperature of 70° C.

An IRGANOX 1010 (manufactured by Ciba Specialty Chemicals) as an antioxidant was added to the resultant polymerization solution so that its content was 500 ppm. Next, the solvent was removed. Thus, a low-crystalline polypropylene A was obtained.

The low-crystalline polypropylene A had a weight-average molecular weight Mw of 75,000 and an Mw/Mn of 2.0.

In addition, the polypropylene had an [mmmm] determined from NMR measurement of 44.6 mol %, an [rrrr]/(1−[mmmm]) of 0.036, an [rmrm] of 2.7 mol %, and an $[mm]\times[rr]/[mr]^2$ of 1.4.

Production Example 2

(Production of Low-Crystalline Polypropylene B)

First, 23.5 L/h of n-heptane, 24.6 mmol/h of triisobutylaluminum, and further, 12.7 µmol/h in terms of zirconium of a catalyst component obtained by bringing dimethylanilinium tetrakispentafluorophenylborate, (1,2'-dimethylsilylene) (2,1'-dimethylsilylene)-bis(3-trimethylsilylmethylindenyl)zirconium dichloride, triisobutylaluminum, and propylene into contact with one another in advance were continuously supplied to a stainless reactor with a stirring machine having an internal volume of 0.2 m³.

Then, propylene and hydrogen were continuously supplied so that a hydrogen concentration in the vapor phase portion and the total pressure in the reactor were kept at 0.7 mol % and 0.75 MPa·G, respectively at a polymerization temperature of 83° C.

An IRGANOX 1010 (manufactured by Ciba Specialty Chemicals) as an antioxidant was added to the resultant polymerization solution so that its content was 500 ppm. Next, the solvent was removed. Thus, a low-crystalline polypropylene B was obtained.

The low-crystalline polypropylene B had a weight-average molecular weight Mw of 45,000 and an Mw/Mn of 2.0. In addition, the polypropylene had an [mmmm] determined from NMR measurement of 44.6 mol %, an [rrrr]/(1−[mmmm]) of 0.036, an [rmrm] of 2.7 mol %, and an $[mm]\times[rr]/[mr]^2$ of 1.4.

TABLE 1

| | Production Example 1 Low-crystalline polypropylene A | Production Example 2 Low-crystalline polypropylene B |
|---|---|---|
| [mmmm] (mol %) | 44.6 | 44.6 |
| [rrrr]/[(1 − [mmmm]) | 0.036 | 0.036 |
| [rmrm] (mol %) | 2.7 | 2.7 |
| $[mm] \times [rr]/[mr]^2$ | 1.4 | 1.4 |
| Weight-average molecular weight (Mw) | 75,000 | 45,000 |
| Molecular weight distribution (Mw/Mn) | 2.0 | 2.0 |

It should be noted that the physical properties were determined by the following measurements.
(Measurements of Weight-Average Molecular Weight (Mw) and Molecular Weight Distribution (Mw/Mn))

A weight-average molecular weight (Mw) and a molecular weight distribution (Mw/Mn) were determined by a gel permeation chromatography (GPC) method. The following apparatus and conditions were used in the measurements. Thus, a weight-average molecular weight in terms of polystyrene was obtained.
<GPC Measuring Apparatus>
Column: TOSO GMHHR-H(S)HT
Detector: RI detector for liquid chromatogram, WATERS 150C
<Measuring Conditions>
Solvent: 1,2,4-trichlorobenzene
Measurement temperature: 145° C.
Flow velocity: 1.0 ml/min
Sample concentration: 2.2 mg/ml
Injection volume: 160 µl Calibration curve: Universal Calibration
Analysis program: HT-GPC (Ver. 1.0)
    (NMR Measurement)
    The measurement of a $^{13}$C-NMR spectrum was performed with the following apparatus under the following conditions. It should be noted that the assignment of a peak was performed in accordance with the method proposed in "Macromolecules, 8, 687 (1975)" by A. Zambelli, et al.
Apparatus: JNM-EX400, $^{13}$C-NMR apparatus manufactured by JEOL
Method: Complete proton decoupling method
Concentration: 220 mg/ml
Solvent: Mixed solvent of 1,2,4-trichlorobenzene and deuterated benzene (90/10, v/v)
Temperature: 130° C.
Pulse width: 45°
Pulse repetition time: 4 seconds
Cumulated number: 10,000 times
    <Calculation Formulas>
M=m/S×100
R=γ/S×100
S=Pββ+Pαβ+Pαγ
S: Signal strength of side-chain methyl carbon atom in all propylene units
Pββ: 19.8 to 22.5 ppm
Pαβ: 18.0 to 17.5 ppm
Pαγ: 17.5 to 17.1 ppm
γ: racemic pentad chain: 20.7 to 20.3 ppm
m: meso pentad chain: 21.7 to 22.5 ppm A meso pentad fraction [mmmm], a racemic pentad fraction [rrrr], and a racemic-meso-racemic-meso pentad fraction [rmrm] are determined in conformity with the method proposed in "Macromolecules, 6, 925 (1973)" by A. Zambelli, et al., and are a meso fraction, a racemic fraction, and a racemic-meso-racemic-meso fraction in a pentad unit in a polypropylene molecular chain measured with the signal of a methyl group in the $^{13}$C-NMR spectrum. As the meso pentad fraction [mmmm] increases, stereoregularity is improved. Triad fractions [mm], [rr], and [mr] were also calculated by the method.

Example 1

(Production of Polypropylene-Based Resin Composition)
    The low-crystalline polypropylene A obtained in Production Example 1 and a high-crystalline polypropylene having an MFR of 1,300 g/10 min (MOPLEN HP461Y, Lyondell Basell, MFR=1,300 g/10 min, Tm=162° C.) were mixed at a blending ratio of 10 mass %:90 mass %, and then the mixture was kneaded with a biaxial extruder at a resin temperature of 220° C. Thus, a resin pellet was obtained.
    (MFR Measurement)
    The MFR of the polypropylene-based resin composition was measured in conformity with JIS K7210 under the conditions of a temperature of 230° C. and a load of 21.18 N. Table 1 shows the result.
    (Measurement of Melting Endotherm)
    10 Milligrams of a sample were held under a nitrogen atmosphere at −10° C. for 5 minutes and then its temperature was increased at 10° C./min with a differential scanning calorimeter (DSC-7 manufactured by PerkinElmer, Inc.). The melting endotherm of the polypropylene-based resin composition was calculated from a melting endothermic curve thus obtained. Table 1 shows the result.
    (Molding of Non-Woven Fabric)
    The polypropylene-based resin composition was molded into a non-woven fabric with a meltblown non-woven fabric apparatus formed of a uniaxial extruder having a gear pump with a screw diameter of 65 mm, a die (hole diameter: 0.36 mm, number of holes: 720 holes), a high-temperature compressed-air generator, a net conveyor, and a winding apparatus as described below.
    The raw material was melted at a resin temperature of 260° C., and then the molten resin was discharged from the die at a rate of 0.1 g/min per hole. The resin was sprayed onto the net conveyor having a line speed of 4.2 m/min with compressed air at 270° C. at a flow rate of 250 m$^3$/hr. The non-woven fabric conveyed by the net conveyor was wound with the winding machine in a roll shape.
    (Measurement of Fiber Diameter)
    Fibers in the non-woven fabric were observed with a polarization microscope, and the average of the diameters of five fibers selected at random was defined as the fiber diameter of the non-woven fabric sample. Table 1 shows the result.
    (Measurement of Number of Shots)
    The number of spots in a range measuring 100 mm by 100 mm arbitrarily selected from the non-woven fabric was defined as the number of shots. Table 1 shows the result.
    (Measurement of Flow Quantity of Air)
    A Frajour type fabric air flow tester (AP-360 available from DAIEI KAGAKU SEIKI MFG. CO., LTD.) was used. A sucking pump was adjusted with a nozzle having a hole diameter of 4 mm so that a pressure difference between both surfaces of a test piece cramped at one end of the cylindrical portion of the tester was 1.27 cm. After that, a value indicated by a vertical barometer was read with a digital manometer, and then a flow quantity was determined from a conversion table. Table 1 shows the result.
    (Measurement of Water Pressure Resistance)
    A measurement was performed in conformity with JIS L1092. The measurement was performed for three arbitrary sites of each of the embossed surface and anti-embossed surface of the non-woven fabric with a water resistance tester (DAIEI KAGAKU SEIKI MFG. CO., LTD.), and then the average of the measured values was defined as a water pressure resistance. Table 1 shows the results.

Example 2

A non-woven fabric was molded in the same manner as in Example 1 except that the amount of the low-crystalline polypropylene was changed to 20 mass % in Example 1, and was then subjected to the same measurements and evaluations. Table 1 shows the results.

Example 3

A non-woven fabric was molded in the same manner as in Example 1 except that the amount of the low-crystalline polypropylene was changed to 40 mass % in Example 1, and was then subjected to the same measurements and evaluations. Table 1 shows the results.

Comparative Example 1

A non-woven fabric was molded in the same manner as in Example 1 except that the low-crystalline polypropylene A was not added in Example 1, and was then subjected to the same measurements and evaluations. Table 1 shows the results.

Comparative Example 2

A non-woven fabric was molded in the same manner as in Example 1 except that the low-crystalline polypropylene A was not added and the flow rate of the compressed air was changed to 200 m$^3$/hr in Example 1, and was then subjected to the same measurements and evaluations. Table 1 shows the results.

TABLE 1

|  |  | Example | | | Comparative Example | |
|---|---|---|---|---|---|---|
|  |  | 1 | 2 | 3 | 1 | 2 |
| Resin composition (mass %) | Low-crystalline polypropylene A | 10 | 20 | 40 | 0 | 0 |
|  | High-crystalline polypropylene | 90 | 80 | 60 | 100 | 100 |
| Characteristics of polypropylene-based resin composition | MFR (g/10 min) | 1,300 | 1,180 | 1,070 | 1,300 | 1,300 |
|  | Melting endotherm (J/g) | 92 | 79 | 58 | 102 | 102 |
| Molding conditions | Single-hole discharge amount (g/min) | 0.1 | 0.1 | 0.1 | 0.1 | 0.1 |
|  | High-temperature compressed air: temperature (° C.) | 270 | 270 | 270 | 270 | 270 |
|  | High-temperature compressed air: flow rate (m³/hr) | 250 | 250 | 250 | 250 | 200 |
| Moldability | Number of shots | 0 | 0 | 0 | 46 | 3 |
| Characteristics of non-woven fabric | Fiber diameter (μm) | 1.5 | 1.0 | 0.9 | 1.5 | 2.5 |
|  | Air flow quantity (ml/sec · cm²) | 22 | 18 | 17 | 21 | 30 |
|  | Water pressure resistance (mmAq)  Embossed surface | 650 | 708 | 735 | 167 | 630 |
|  | Water pressure resistance (mmAq)  Anti-embossed surface | 718 | 723 | 750 | 324 | 718 |

Example 4

(Production of Polypropylene-Based Resin Composition)

The low-crystalline polypropylene B obtained in Production Example 2 and a high-crystalline polypropylene having an MFR of 1,300 g/10 min (MOPLEN HP461Y, Lyondell Basell, MFR=1, 300 g/10 min, Tm=162° C.) were mixed at a blending ratio of 10 mass %:90 mass %, and then the mixture was kneaded with a biaxial extruder at a resin temperature of 220° C. Thus, a resin pellet was obtained. The MFR measurement and the measurement of the melting endotherm were performed under the conditions described in the foregoing. Table 2 shows the results.

(Molding of Non-Woven Fabric)

The polypropylene-based resin composition was molded into a non-woven fabric with a meltblown non-woven fabric apparatus formed of a uniaxial extruder having a gear pump with a screw diameter of 65 mm, a die (hole diameter: 0.36 mm, number of holes: 720 holes), a high-temperature compressed-air generator, a net conveyor, and a winding apparatus as described below.

The raw material was melted at a resin temperature of 260° C., and then the molten resin was discharged from the die at a rate of 0.1 g/min per hole. The resin was sprayed onto the net conveyor having a line speed of 4.2 m/min with compressed air at 270° C. at a flow rate of 250 m³/hr. The non-woven fabric conveyed by the net conveyor was wound with the winding machine in a roll shape.

(Measurement of Fiber Diameter)

A fiber diameter was measured by the method described in the foregoing. Table 2 shows the result.

(Measurement of Basis Weight)

The mass of a site measuring 5 cm by 5 cm of the resultant non-woven fabric was measured, and then its basis weight (g/m²) was calculated. Table 2 shows the result.

(Measurement of Flow Quantity of Air)

The flow quantity of air was measured by the method described in the foregoing. Table 2 shows the result.

Example 5

A non-woven fabric was molded in the same manner as in Example 4 except that the quantity of the high-temperature compressed air was changed to 420 m³/hr in Example 4, and was then subjected to the same measurements and evaluations. Table 2 shows the results.

Example 6

A non-woven fabric was molded in the same manner as in Example 4 except that the quantity of the high-temperature compressed air was changed to 550 m³/hr in Example 4, and was then subjected to the same measurements and evaluations. Table 2 shows the results.

Example 7

A non-woven fabric was molded in the same manner as in Example 4 except that the amount of the low-crystalline polypropylene B was changed to 25 mass % in Example 4, and was then subjected to the same measurements and evaluations. Table 2 shows the results.

Example 8

A non-woven fabric was molded in the same manner as in Example 7 except that the quantity of the high-temperature compressed air was changed to 420 m³/hr in Example 7, and was then subjected to the same measurements and evaluations. Table 2 shows the results.

Example 9

A non-woven fabric was molded in the same manner as in Example 7 except that the quantity of the high-temperature compressed air was changed to 550 m³/hr in Example 7, and was then subjected to the same measurements and evaluations. Table 2 shows the results.

Example 10

A non-woven fabric was molded in the same manner as in Example 4 except that the amount of the low-crystalline polypropylene B was changed to 50 mass % in Example 4, and was then subjected to the same measurements and evaluations. Table 2 shows the results.

Example 11

A non-woven fabric was molded in the same manner as in Example 10 except that the quantity of the high-temperature compressed air was changed to 420 m³/hr in Example 10, and was then subjected to the same measurements and evaluations. Table 2 shows the results.

Example 12

A non-woven fabric was molded in the same manner as in Example 10 except that the quantity of the high-temperature compressed air was changed to 550 m³/hr in Example 10, and was then subjected to the same measurements and evaluations. Table 2 shows the results.

Comparative Example 3

A non-woven fabric was molded in the same manner as in Example 4 except that the low-crystalline polypropylene B was not added in Example 4, and was then subjected to the same measurements and evaluations. Table 2 shows the results.

Comparative Example 4

A non-woven fabric was molded in the same manner as in Example 5 except that the low-crystalline polypropylene B was not added in Example 5, and was then subjected to the same measurements and evaluations. Table 2 shows the results.

Comparative Example 5

A non-woven fabric was molded in the same manner as in Example 6 except that the low-crystalline polypropylene B was not added in Example 6, and was then subjected to the same measurements and evaluations. Table 2 shows the results.

and then the molten resin was discharged from nozzles each having a nozzle diameter of 0.5 mm (number of holes: 501 holes) at a rate of 0.5 g/min per hole so as to be spun.

Fibers obtained by the spinning were laminated on a net surface moving at a line speed of 50 m/min at an ejector pressure of 1.6 kg/cm² so that a spunbonded non-woven fabric (S) having a basis weight of 9 g/m² was obtained.

Next, a non-woven fabric laminate was produced with a meltblown non-woven fabric apparatus formed of a uniaxial extruder having a screw diameter of 65 mm, a die (hole diameter: 0.36 mm, number of holes: 720 holes), a high-temperature compressed air-generating apparatus, a net conveyor, an embossing apparatus, and a winding apparatus by the following method.

First, the polypropylene-based resin composition described in Example 8 was melted at a resin temperature of 260° C., and then the molten resin was discharged at a rate of 0.3 g/min per hole. The molten resin was sprayed onto the spunbonded non-woven fabric (S) with compressed air at 270° C. at a flow rate of 420 m³/hr. Immediately after that, another spunbonded non-woven fabric (S) was further superimposed on the resultant. Those non-woven fabrics were fused by being pressurized with a heating roll at 125° C. at a nip pressure of 40 N/cm. Thus, a non-woven fabric laminate formed of the spunbonded non-woven fabric (S),

TABLE 2

| | | Example | | | | | |
|---|---|---|---|---|---|---|---|
| | | 4 | 5 | 6 | 7 | 8 | 9 |
| Resin composition (mass %) | Low-crystalline polypropylene B | 10 | 10 | 10 | 25 | 25 | 25 |
| | High-crystalline polypropylene | 90 | 90 | 90 | 75 | 75 | 75 |
| Characteristics of polypropylene-based resin composition | MFR (g/10 min) | 1,400 | 1,400 | 1,400 | 1,500 | 1,500 | 1,500 |
| | Melting endotherm (J/g) | 90 | 90 | 90 | 73 | 73 | 73 |
| Molding conditions | Single-hole discharge amount (g/min) | 0.3 | 0.3 | 0.3 | 0.3 | 0.3 | 0.3 |
| | High-temperature compressed air: temperature (° C.) | 270 | 270 | 270 | 270 | 270 | 270 |
| | High-temperature compressed air: flow rate (m³/hr) | 250 | 420 | 550 | 250 | 420 | 550 |
| Characteristics of non-woven fabric | Fiber diameter (μm) | 3.7 | 2.4 | 2.0 | 3.7 | 2.4 | 1.8 |
| | Basis weight (g/sm²) | 15 | 15 | 15 | 15 | 15 | 15 |
| | Air flow quantity (ml/sec · cm²) | 91 | 47 | 44 | 105 | 46 | 40 |

| | | Example | | | Comparative Example | | |
|---|---|---|---|---|---|---|---|
| | | 10 | 11 | 12 | 3 | 4 | 5 |
| Resin composition (mass %) | Low-crystalline polypropylene B | 50 | 50 | 50 | 0 | 0 | 0 |
| | High-crystalline polypropylene | 50 | 50 | 50 | 100 | 100 | 100 |
| Characteristics or polypropylene-based resin composition | MFR (g/10 min) | 1,600 | 1,600 | 1,600 | 1,300 | 1,300 | 1,300 |
| | Melting endotherm (J/g) | 50 | 50 | 50 | 102 | 102 | 102 |
| Molding conditions | Single-hole discharge amount (g/min) | 0.3 | 0.3 | 0.3 | 0.3 | 0.3 | 0.3 |
| | High-temperature compressed air: temperature (° C.) | 270 | 270 | 270 | 270 | 270 | 270 |
| | High-temperature compressed air: flow rate (m³/hr) | 250 | 420 | 550 | 250 | 420 | 550 |
| Characteristics of non-woven fabric | Fiber diameter (μm) | 3.3 | 2.2 | 1.7 | 4.9 | 2.9 | 2.2 |
| | Basis weight (g/sm²) | 15 | 15 | 15 | 15 | 15 | 15 |
| | Air flow quantity (ml/sec · cm²) | 90 | 39 | 34 | 119 | 56 | 48 |

Example 13

A high-crystalline polypropylene having an MFR of 60 g/10 min (NOVATEC SA-06, manufactured by Japan Polypropylene Corporation, MFR=60 g/10 min, Tm=160° C.) was melted and extruded at a resin temperature of 230° C., the meltblown non-woven fabric (M), and the spunbonded non-woven fabric (S) was obtained.

The resultant non-woven fabric laminate was subjected to the measurement of its basis weight, and the measurements of its flow quantity of air and water pressure resistance. Table 3 shows the results.

Comparative Example 6

A non-woven fabric laminate was molded in the same manner as in Example 13 except that a meltblown non-woven fabric (M) was molded by using the polypropylene-based resin composition described in Comparative Example 4 instead of the polypropylene-based resin composition described in Example 8, and was then subjected to the same measurements. Table 3 shows the results.

TABLE 3

| | | | Example 13 | Comparative Example 6 |
|---|---|---|---|---|
| Spunbonded non-woven fabric (S) | Resin composition | High-crystalline polypropylene 1 (mass %) | 100 | 100 |
| | Resin characteristic | MFR (g/10 min) | 60 | 60 |
| | Molding conditions | Single-hole discharge amount (g/min) | 0.5 | 0.5 |
| | | Ejector pressure (kg/cm$^2$) | 1.6 | 1.6 |
| Meltblown non-woven fabric (M) | Resin composition | Low-crystalline polypropylene B (mass %) | 25 | 0 |
| | | High-crystalline polypropylene 2 (mass %) | 75 | 100 |
| | Characteristics of resin composition | MFR (g/10 min) | 1,500 | 1,300 |
| | | Melting endotherm (J/g) | 73 | 102 |
| | Molding conditions | Single-hole discharge amount (g/min) | 0.3 | 0.3 |
| | | High-temperature compressed air: temperature (° C.) | 270 | 270 |
| | | High-temperature compressed air: flow rate (m$^3$/hr) | 420 | 420 |
| Non-woven fabric laminate (S/M/S) | Embossing conditions | Roll temperature (° C.) | 125 | 125 |
| | | Nip pressure (N/cm) | 40 | 40 |
| | Characteristics of non-woven fabric | Basis weight (g/m$^2$) | 23 | 23 |
| | | Air flow quantity (ml/sec · cm$^2$) | 79 | 88 |
| | | Water pressure resistance (mmAq) Embossed surface | 361 | 324 |
| | | Anti-embossed surface | 364 | 326 |

High-crystalline polypropylene 1: Novatec SA-06
High-crystalline polypropylene 2: Moplen HP461Y

INDUSTRIAL APPLICABILITY

The non-woven fabric of the present invention has an extremely small mesh size, is excellent in water pressure resistance, and is preferably used particularly in a hygienic material such as a paper diaper.

The invention claimed is:

1. A non-woven fabric, is obtained by a process comprising producing a non-woven fabric from a polypropylene-based resin composition,
wherein the polypropylene-based resin composition comprises a low-crystalline polypropylene and a high-crystalline polypropylene;
the polypropylene-based resin composition comprises the low-crystalline polypropylene at a content of from 5 to 50 mass % with reference to a total of the low-crystalline polypropylene and the high-crystalline polypropylene;
the polypropylene-based resin composition has a melt flow rate of from 500 to 2,000 g/10 min and a melting endotherm ΔH measured by DSC of from 50 to 95 J/g; and
the low-crystalline polypropylene satisfies (a) to (f):
(a) [mmmm] is from 20 to 60 mol %;
(b) [rrrr/(1−mmmm)]≤0.1;
(c) [rmrm]>2.5 mol %;
(d) [mm]×[rr]/[mr]$^2$≤2.0;
(e) weight-average molecular weight (Mw) is from 10,000 to 200,000; and
(f) molecular weight distribution (Mw/Mn)<4
wherein the low-crystalline propylene homo-polymer, and
wherein the process comprises a meltdown method.

2. A non-woven fabric laminate, comprising the non-woven fabric of claim 1.

3. A fiber product, comprising the non-woven fabric of claim 1.

4. A fiber product, comprising the non-woven fabric laminate of claim 2.

5. A hygienic material, comprising the non-woven fabric of claim 1.

6. The hygienic material of claim 5, wherein the hygienic material is a paper diaper.

7. The non-woven fabric of claim 1, wherein [mmmm] of the low-crystalline polypropylene is from 30 to 50 mol %.

8. The non-woven fabric of claim 1, wherein [rrrr]/(1−[mmmm]) of the low-crystalline polypropylene is 0.05 or less.

9. The non-woven fabric of claim 1, wherein an average fiber diameter of the fabric is about 1.0 μm or less.

10. The non-woven fabric laminate of claim 2, comprising:
a meltblown non-woven fabric, and
a first spunbound non-woven fabric, laminated with the meltblown non-woven fabric.

11. The non-woven fabric laminate of claim 10, further comprising:
a second spunbound non-woven fabric layer, on an opposite side of the meltblown non-woven fabric layer from the first spunbound non-woven fabric layer.

12. The non-woven fabric laminate of claim 11, wherein a basis weight of the laminate is from 7 to 100 g/m².

13. A process for producing the non-woven fabric of claim 1, comprising:
producing a non-woven fabric from a polypropylene-based resin composition,
wherein the polypropylene-based resin composition comprises a low-crystalline polypropylene and a high-crystalline polypropylene;
the polypropylene-based resin composition comprises the low-crystalline polypropylene at a content of from 5 to 50 mass % with reference to a total of the low-crystalline polypropylene and the high-crystalline polypropylene;
the polypropylene-based resin composition has a melt flow rate of from 500 to 2,000 g/10 min and a melting endotherm ΔH measured by DSC of from 50 to 95 J/g; and
the low-crystalline polypropylene satisfies (a) to (f):
(a) [mmmm] is from 20 to 60 mol %;
(b) [rrrr/(1-mmmm)]≤0.1;
(c) [rmrm]>2.5 mol %;
(d) [mm]×[rr]/[mr]²≤2.0;
(e) weight-average molecular weight (Mw) is from 10,000 to 200,000; and
(f) molecular weight distribution (Mw/Mn)<4,
wherein the low-crystalline polypropylene is a propylene homo-polymer, and
wherein the producing comprises producing by a melt-down method.

14. A process of producing a non-woven fabric laminate, comprising:
producing a non-woven fabric by the process of claim 13, and
laminating the non-woven fabric with another fabric layer, thereby obtaining the laminate.

15. The process of claim 13, wherein
a melting temperature of the resin is from 220 to 270° C.,
a single-hole discharge amount of from 0.1 to 0.5 g/min,
a temperature of the heated gas flow of from 250 to 280° C., and
a flow rate of the heated gas flow of from 200 to 600 m³/hr.

* * * * *